United States Patent
Miron et al.

(10) Patent No.: US 12,081,513 B2
(45) Date of Patent: Sep. 3, 2024

(54) ORGANIZATIONAL MODELLING FOR ROUTING RPA RELATED SERVICES OF AN RPA CLOUD SUITE

(71) Applicant: UiPath, Inc., New York, NY (US)

(72) Inventors: Titus Miron, Seattle, WA (US); Tarek Madkour, Sammamish, WA (US); Cosmin Popescu, Bellevue, WA (US); Ankit Goyal, Bellevue, WA (US); Faisal Ilaiwi, Kirkland, WA (US); Keerthi Kiran Valathoru, Redmond, WA (US); Gong Zhang, Issaquah, WA (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/121,631

(22) Filed: Dec. 14, 2020

(65) Prior Publication Data
US 2022/0191167 A1    Jun. 16, 2022

(51) Int. Cl.
| | | |
|---|---|---|
| *H04L 61/50* | (2022.01) | |
| *G05B 19/414* | (2006.01) | |
| *H04L 67/10* | (2022.01) | |
| *H04L 101/618* | (2022.01) | |

(52) U.S. Cl.
CPC .......... *H04L 61/50* (2022.05); *G05B 19/4147* (2013.01); *H04L 67/10* (2013.01); *G05B 2219/32125* (2013.01); *G05B 2219/50391* (2013.01); *H04L 2101/618* (2022.05)

(58) Field of Classification Search
CPC ..... H04L 61/20; H04L 61/6018; H04L 67/10; H04L 67/12; H04L 41/044; G05B 19/4147; G05B 2219/32125; G05B 2219/50391; G06F 9/06
See application file for complete search history.

(56) References Cited

U.S. PATENT DOCUMENTS

| | | | |
|---|---|---|---|
| 9,268,545 B2 | 2/2016 | Lortz et al. | |
| 10,534,796 B1 * | 1/2020 | Lieberman | G06F 16/184 |
| 10,802,889 B1 * | 10/2020 | Ganesan | G06F 9/5005 |

(Continued)

FOREIGN PATENT DOCUMENTS

| | | | | |
|---|---|---|---|---|
| CN | 106936932 A | 7/2017 | | |
| WO | WO-2020252081 A1 * | 12/2020 | | B25J 9/06 |

OTHER PUBLICATIONS

J. Wan et al. Cloud Robotics: Current Status and Open Issues, May 30, 2016, IEEE Access, Digital Object Identifier 10.1109 / ACCESS.2016.2574979, pp. 2797-2807 (Year: 2016).*

(Continued)

*Primary Examiner* — Phyllis A Book
(74) *Attorney, Agent, or Firm* — Chiesa Shahinian & Giantomasi PC (57) ABSTRACT

Systems and methods for implementing an RPA (robotic process automation) cloud suite comprising a plurality of RPA related services are provided. Each of the plurality of RPA related services of the RPA cloud suite is associated with one of a plurality of nodes of a hierarchical model. A routing address for each respective RPA related service of the plurality of RPA related services is defined according to a standardized format for the RPA cloud suite based on the node associated with the respective RPA related service.

27 Claims, 8 Drawing Sheets

(56) References Cited

U.S. PATENT DOCUMENTS

| | | | |
|---|---|---|---|
| 2015/0081885 A1* | 3/2015 | Thomas | H04L 41/5054 |
| | | | 709/224 |
| 2017/0132567 A1* | 5/2017 | Glunz | G06T 17/05 |
| 2017/0132568 A1* | 5/2017 | Glunz | H04L 67/10 |
| 2018/0203994 A1* | 7/2018 | Shukla | G06F 21/45 |
| 2019/0028431 A1 | 1/2019 | Keller et al. | |
| 2021/0004711 A1* | 1/2021 | Gupta | G06N 5/02 |
| 2021/0006661 A1* | 1/2021 | Gramacho | H04L 67/10 |
| 2021/0133650 A1* | 5/2021 | Cella | G06Q 10/0637 |
| 2021/0162592 A1* | 6/2021 | Han | G06N 5/04 |
| 2021/0252704 A1* | 8/2021 | Hall | G05B 19/0426 |
| 2021/0294303 A1* | 9/2021 | Nott | G06F 9/4881 |

OTHER PUBLICATIONS

Centrify Corporation, "Use your Tenant URL," retrieved online on Sep. 11, 2020, from https://developer.centrify.com/docs/about-tenantsnew, 1 pg.

Citrix Systems, Inc., "Okta Organizations," retrieved online on Sep. 11, 2020, from https://developer.okta.com/docs/concepts/okta-organizations/, 6 pgs.

Apigee Edge, "Understanding organizations," retrieved online on Sep. 11, 2020, from https://docs.apigee.com/api-platform/fundamentals/apigee-edge-organization-structure#/organizationcomponents-organizationcomponents, 7 pgs.

* cited by examiner

Associate each of the plurality of RPA related services of the RPA cloud suite with one of a plurality of nodes of a hierarchical model
502

---

Define a routing address for each respective RPA related service of the plurality of RPA related services according to a standardized format for the RPA cloud suite based on the node associated with the respective RPA related service
504

Receive a request for accessing the RPA related service of the RPA cloud suite via a routing address, the routing address defined according to a standardized format for the RPA cloud suite based on a node of a hierarchical model associated with the RPA related service
702

Provide access to the RPA related service
704

ORGANIZATIONAL MODELLING FOR ROUTING RPA RELATED SERVICES OF AN RPA CLOUD SUITE

TECHNICAL FIELD

The present invention relates generally to robotic process automation (RPA), and more particularly to organizational modelling for routing RPA related services of an RPA cloud suite.

BACKGROUND

An application suite is a collection of services or programs of related functionality. One example of an application suite is an RPA suite, which may comprise services for discovering automatable processes, building workflows for the discovered processes, managing and monitoring workflows, executing workflows, and measuring performance of executed workflows. Recently, application suites have been implemented for access via the cloud. However, cloud application suites are not conventionally accessible using routing addresses defined with a standardized format. Accordingly, conventional cloud application suites are relatively more difficult to manage for developers and more difficult to access for end users.

BRIEF SUMMARY OF THE INVENTION

In accordance with one or more embodiments, systems and methods for implementing an RPA (robotic process automation) cloud suite comprising a plurality of RPA related services are provided. Each of the plurality of RPA related services of the RPA cloud suite is associated with one of a plurality of nodes of a hierarchical model. A routing address for each respective RPA related service of the plurality of RPA related services is defined according to a standardized format for the RPA cloud suite based on the node associated with the respective RPA related service.

In one embodiment, the hierarchical model is based on an organizational structure of an entity for which the RPA cloud suite is being implemented. The hierarchical model may comprise a first level having an organization node corresponding to the entity and a second level having one or more tenant nodes each corresponding to a unit of the entity. A scope of service of the RPA related services is defined based on their associated node. In one embodiment, licenses for one or more of the RPA related services are associated with one of the plurality of nodes of the hierarchical model.

In one embodiment, the routing address for each respective RPA related service is defined based on a hierarchy of the hierarchical model. The routing address may be a URL (uniform resource locator).

In one embodiment, permissions may be defined for one or more nodes of the hierarchical model to define permissions for RPA related services associated with the one or more nodes.

In accordance with one or more embodiments, systems and methods for accessing an RPA related service of an RPA cloud suite are provided. A request for accessing the RPA related service of the RPA cloud suite is received via a routing address. The routing address is defined according to a standardized format for the RPA cloud suite based on a node of a hierarchical model associated with the RPA related service. In response to receiving the request, access to the RPA related service is provided.

In one embodiment, the hierarchical model is based on an organizational structure of an entity for which the RPA cloud suite was implemented. The hierarchical model comprises a first level having an organization node corresponding to the entity and a second level having one or more tenant nodes each corresponding to a unit of the entity.

In one embodiment, a scope of service of the RPA related service is defined based on the associated node. Permissions for the RPA related service may be defined by defining permissions for the associated node.

In one embodiment, the routing address for the RPA related service is based on a hierarchy of the hierarchical model. The routing address may be a URL.

These and other advantages of the invention will be apparent to those of ordinary skill in the art by reference to the following detailed description and the accompanying drawings.

DETAILED DESCRIPTION

Figure 1:
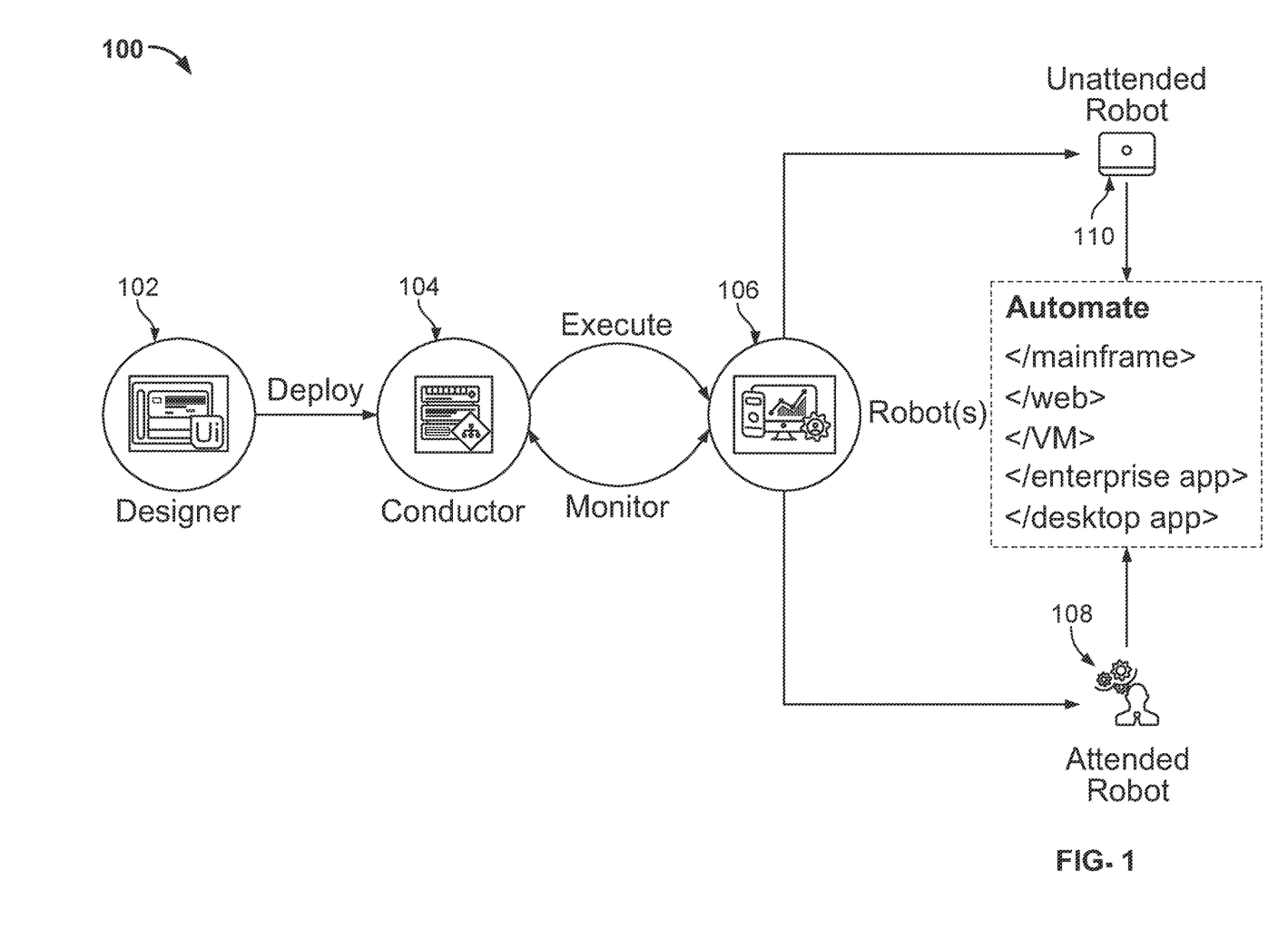
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
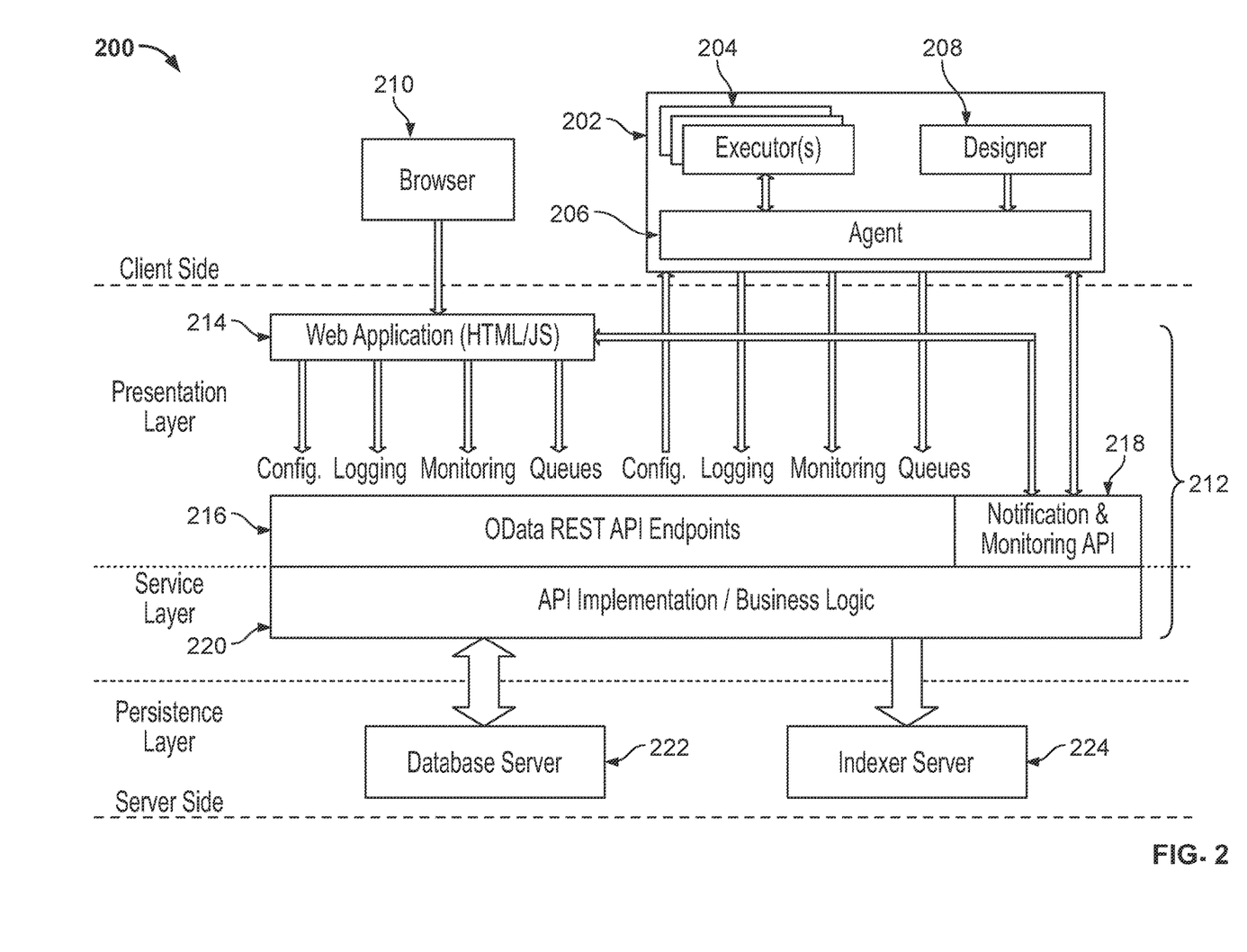
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
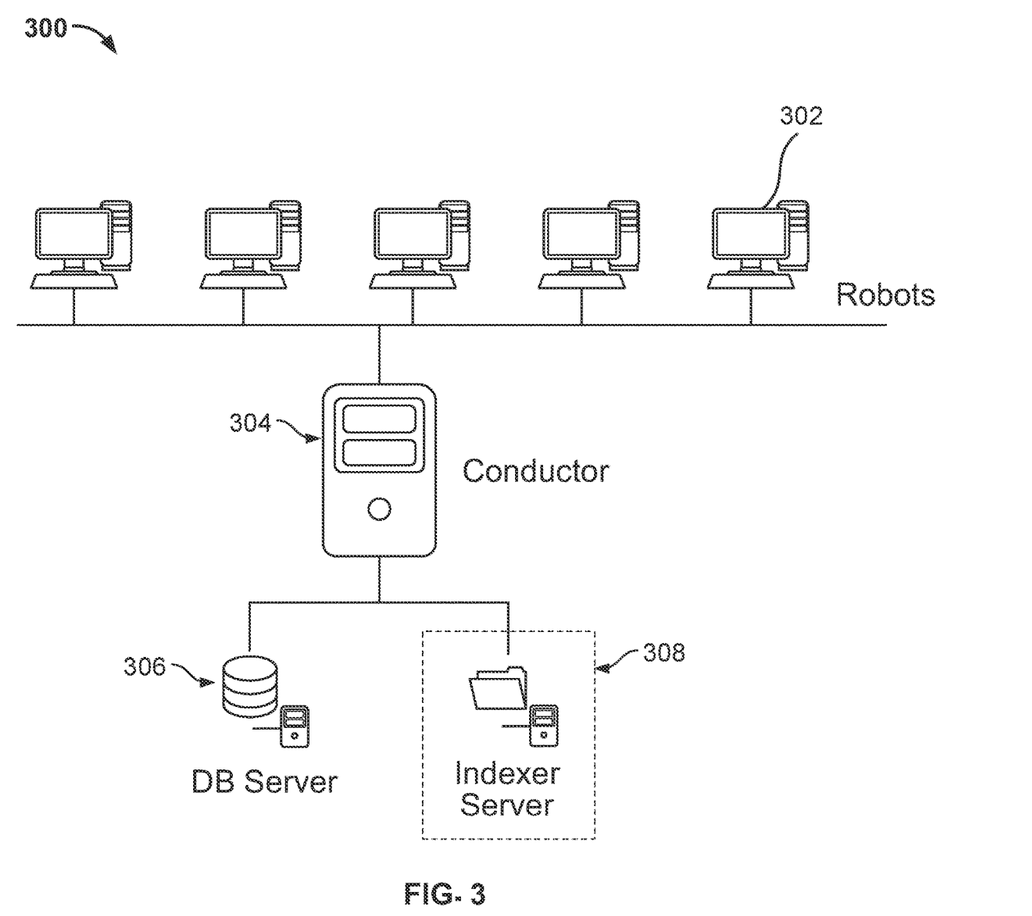
FIG. 3 is an architectural diagram illustrating a simplified deployment example of a RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, RPA system 100 of FIG. 1, RPA system 200 of FIG. 2, and/or RPA system 300 of Figure may be implemented for cloud-based management of RPA robots. Such cloud-based management of RPA robots enables RPA to be provided as Software as a Service (SaaS). Accordingly, conductor 104 of FIG. 1, conductor 212 of FIG. 2, and/or conductor 304 of FIG. 3 is implemented in the cloud for cloud-based management of RPA robots to, e.g., create RPA robots, provision RPA robots, schedule tasks on RPA robots, decommission RPA robots, or effectuate any other orchestration task for managing RPA robots.

Figure 4:
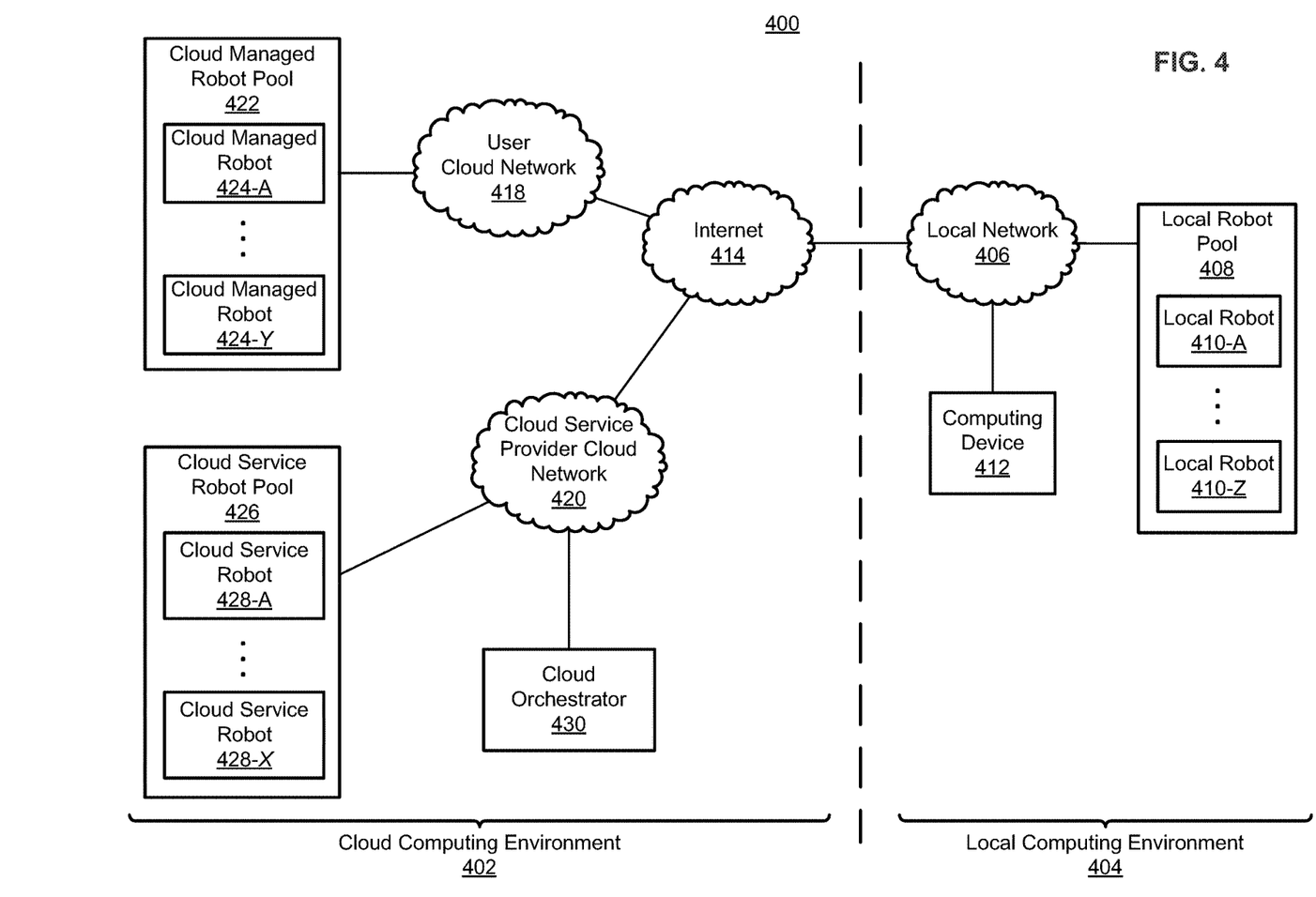
FIG. 4 shows an architecture diagram illustrating a cloud RPA system for implementing cloud-based management of robotic process automation robots, according to an embodiment of the invention.

FIG. 4 illustrates an architectural diagram of a cloud RPA system 400 for implementing cloud-based management of RPA robots, in accordance with one or more embodiments. Cloud RPA system 400 comprises a cloud computing environment 402 and a local computing environment 404. Local computing environment 404 represents a local network architecture of a user or any other entity or entities, such as, e.g., a company, a corporation, etc. Local computing environment 404 comprises local network 406. Cloud computing environment 402 represents a cloud computing network architecture that provides services or processing of workloads remote from the user at local computing environment 404. Cloud computing environment 402 comprises various cloud networks, including internet 414, user cloud network 418 representing a cloud network managed (or controlled) by the user and hosted by a cloud platform provider, and a cloud service provider cloud network 420 representing a cloud network managed by a cloud service provider and hosted by a cloud platform provider. The cloud service provider is an entity that provides services (e.g., RPA) via the cloud. The cloud platform provider is an entity that maintains cloud computing infrastructure. Local network 406 of local computing environment 404 is communicatively coupled to internet 414 of cloud computing environment 402 to facilitate communication between local computing environment 404 and cloud computing environment 402.

As shown in FIG. 4, a cloud orchestrator 430 is implemented in cloud computing environment 402 to enable cloud-based management of RPA robots. In particular, cloud orchestrator 430 is managed by a cloud service provider and hosted in cloud service provider cloud network 420 within cloud computing environment 402. In one embodiment, the cloud service provider provides RPA to the user in local computing environment 404.

Cloud orchestrator 430 manages RPA robots in cloud computing environment 402. In particular, the user interacts with computing device 412 in local computing environment 404 to transmit instructions for managing RPA robots to cloud orchestrator 430 in cloud computing environment 402. Alternatively, the user interacts with computing device 412 in local computing environment 404 to set a schedule on cloud orchestrator 430 to automatically transmit instructions on behalf of the user for managing RPA robots. Exemplary instructions for managing RPA robots include instructions for creating RPA robots, provisioning RPA robots, scheduling a task on RPA robots (e.g., schedule a time for performing the task and a type of robot to perform the task), decommissioning RPA robots, or any other orchestration instructions for RPA robots. In response to receiving the instructions, cloud orchestrator 430 effectuates the instructions by, e.g., creating the RPA robots, provisioning the RPA robots, scheduling the task of the RPA robot, decommissioning the RPA robots, etc. In one embodiment, cloud orchestrator 430 may be similar to conductor 104 of FIG. 1, conductor 212 of FIG. 2, or conductor 304 of FIG. 3, but implemented in cloud service provider cloud network 420 within cloud computing environment 402.

The RPA robots managed by cloud orchestrator 430 may include a pool of cloud robots that are deployed and maintained within cloud computing environment 402. Such cloud robots may include one or more cloud service robots 428-A, . . . , 428-X (hereinafter collectively referred to as cloud service robots 428) of cloud service robot pool 426 and one or more cloud managed robots 424-A, . . . , 424-Y (hereinafter collectively referred to as cloud managed robots 424) of cloud managed robot pool 422. Such cloud robots perform (i.e., process) tasks in cloud computing environment 402 and transmit results of the tasks to the user in local computing environment 404. Additionally or alternatively, the RPA robots managed by cloud orchestrator 430 may include one or more local robots 410-A, . . . , 410-Z (hereinafter collectively referred to as local robots 410) of local robot pool 408.

Cloud service robots 428 are maintained by the cloud service provider in cloud service provider cloud network 420 for performing RPA tasks in cloud computing environment 402 for the user in local network environment 404. Cloud service robots 428 are created upon request by the user sending instructions from computing device 412 to cloud orchestrator 430. Upon creation, cloud service robots 428 enter into a standby mode while waiting to perform a task (or workflow). While in standby mode, the cost for running the cloud service robots 428 is minimized or otherwise reduced. Tasks are scheduled on cloud service robots 428 by the user sending instructions from computing device 412 to cloud orchestrator 430. The instructions for scheduling tasks defines the time for performing the task and a type of robot for performing the task. Cloud service robots 428 wake up from standby mode to perform the task and return to standby mode once the task is complete. Accordingly, cloud service robots 428 perform the tasks on cloud service provider cloud network 420 for the user in local computing environment 404.

Cloud managed robots 424 are maintained by the user in a user cloud network 418 for performing RPA tasks in cloud computing environment 402 for the user in local network environment 404. Cloud managed robots 424 are similar in capability to cloud service robots 428 and are also hosted in cloud computing environment 402. However, user cloud network 418, upon which cloud managed robots 424 are hosted, is managed by the user while cloud service provider cloud network 420, upon which cloud service robots 428 are hosted, is managed by the cloud service provider and hosted by the cloud platform provider. Cloud orchestrator 430 manages cloud managed robots 424 by establishing a connection between cloud service provider cloud network 420 and user cloud network 418. User cloud network 418 may be established by the user utilizing cloud provider technology to tunnel back to local network 406. The user can establish a dedicated network connection from local network 406 to cloud service provider cloud network 420. Connectivity is typically in the form of, e.g., an any-to-any (e.g., internet protocol virtual private network) network, a point-to-point Ethernet network, or a virtual cross-connection through a connectivity provider at a co-location facility. These connections do not go over the public Internet. This offers more reliability, faster speeds, consistent latencies, and higher security than typical connections over the Internet. User cloud network 418 continues to be fully controlled and managed by the user, thereby providing stringent control over data to the user.

Once the connection between cloud service provider cloud network 420 and user cloud network 418 has been established, cloud managed robots 424 are created upon request by the user interacting with cloud orchestrator 430 via computing device 412. Cloud managed robots 424 are created on user cloud network 418. Accordingly, cloud managed robots 424 perform the tasks on user cloud network 418 for the user in local computing environment 404. Algorithms may be applied to maximize the utilization of the robots in cloud managed robot pool 422 and to reduce operating costs for the user.

Local robots 410 are maintained by the user in local network 406 for performing RPA tasks for the user in local network environment 404. Local network 406 is controlled or otherwise managed by the user. Cloud Orchestrator 430 maintains a connection to local robots 410 through standard HTTPS connectivity.

An RPA cloud suite may be implemented to enable users to manage, monitor, or otherwise interact with RPA system 100 of FIG. 1, RPA system 200 of FIG. 2, RPA system 300 of FIG. 3, and/or cloud RPA system 400 of FIG. 4 via the cloud. An RPA cloud suite is a collection of RPA related services or applications accessible via the cloud. Exemplary RPA related services include services for discovering automatable processes, building workflows for the discovered processes, managing and monitoring workflows, executing workflows, measuring performance of executed workflows, or any other RPA related service. In accordance with embodiments described herein, an RPA cloud suite is implemented for an entity by defining routing addresses for the RPA related services of the RPA cloud suite according to a standardized format based on a hierarchical model of the entity. Such routing addresses enable all RPA related services of the RPA cloud suite to be accessed via the cloud using a common and consistent addressing scheme. Advantageously, RPA cloud suites implemented in accordance with embodiments described herein provide end users with relatively easy access to each of the RPA related services of the RPA cloud suite, while also providing developers with ease of configuring and managing the RPA cloud suite.

Figure 5:
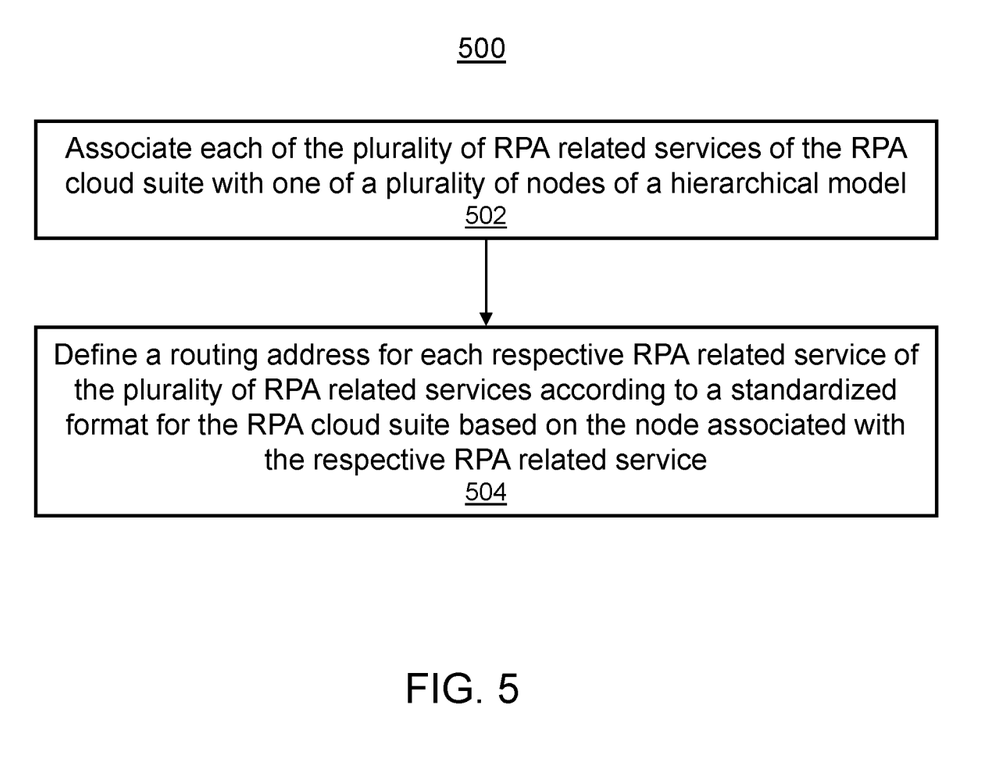
FIG. 5 shows a method for implementing an RPA cloud suite comprising a plurality of RPA related services, according to an embodiment of the invention.

FIG. 5 shows a method 500 for implementing an RPA cloud suite comprising a plurality of RPA related services, in accordance with one or more embodiments. The steps of method 500 may be performed by one or more suitable computing devices, such as, e.g., computing system 800 of FIG. 8. The RPA cloud suite may be implemented for an entity, such as, e.g., an organization, a company, or any other entity, for access via the cloud. In one embodiment, the entity is an RPA customer and the RPA cloud suite is implemented by an RPA provider.

At step 502, each of the plurality of RPA related services of the RPA cloud suite is associated with one of a plurality of nodes of a hierarchical model. The plurality of RPA related services of the RPA cloud suite may comprise any RPA related service, such as services for, e.g., discovering automatable processes, building workflows for the discovered processes, managing and monitoring workflows, executing workflows, measuring performance of executed workflows, or any other RPA related service.

Figure 6:
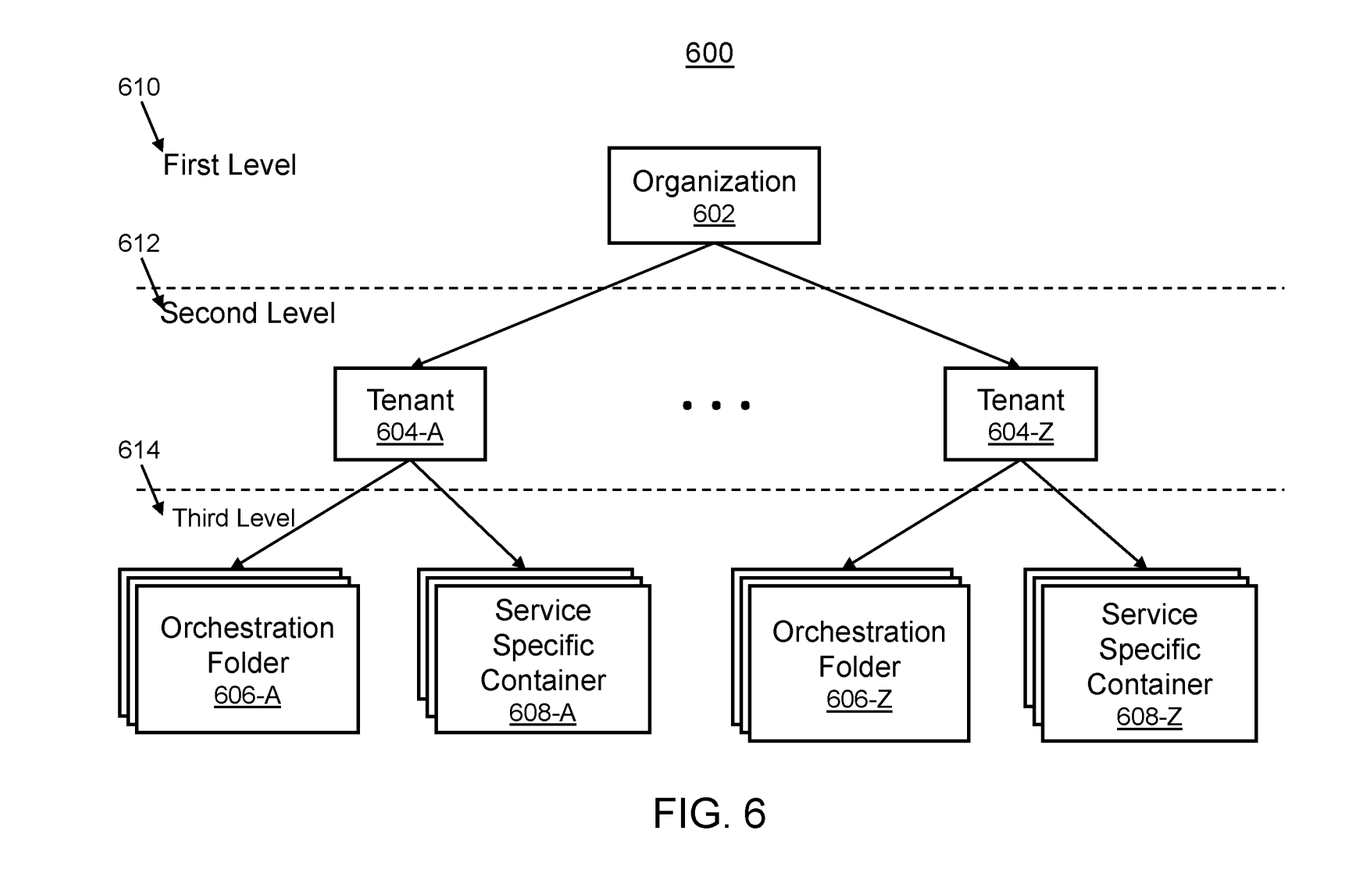
FIG. 6 shows an exemplary hierarchical model, according to an embodiment of the invention.

In one embodiment, the hierarchical model is based on an organizational structure of the entity for which the RPA suite is being implemented. FIG. 6 shows an exemplary hierarchal model 600, in accordance with one or more embodiments. Hierarchical model 600 may be the hierarchical model of step 502 in FIG. 5. The root node of hierarchical model 600, at a first level 610, is organization node 602. Organization node 602 corresponds to the entity for which the RPA suite is being implemented. RPA related services (and possibly other data) associated with organization node 602 are isolated from other entities (associated with other organization nodes of other hierarchical models). At a second level 612 of hierarchical model 600 are one or more tenant nodes 604-A, . . . , 604-Z (collectively referred to herein as tenant nodes 604), which are child nodes of organization node 602. Each tenant node 604 corresponds to a unit of the entity. For example, the units may be functional units of the entity (e.g., development, production, etc.), geographical units of the entity (e.g., United States region, Asia Pacific region, etc.), or any other unit of the entity. RPA related services and data associated with a particular tenant node 604 are isolated from RPA related services associated with other tenant nodes 604. At a third level 614 of hierarchy 600 are one or more orchestration folder nodes 606-A, . . . , 606-Z (collectively referred to herein as orchestration folder nodes 606) and one or more service specific container nodes 608-A, . . . , 608-Z (collectively referred to herein as service specific container nodes 608). Orchestration folder nodes 606 and service specific container nodes are child nodes of respective tenant nodes 604. Orchestration folder nodes 606 correspond to automation management divisions within a unit of the entity. For example, automation management divisions may include a finance department, a human resources department, etc. Each service specific container node 608 is a container holding a respective RPA related service. Service specific container nodes 608 stores logic and/or data for the respective RPA related service.

Each RPA related service is associated with one or more of the nodes of hierarchical model 600. In one embodiment, each RPA related service is associated with one of organization node 602 or a tenant node 604. By associating RPA related services with nodes of hierarchical model 600, a scope of service within the entity is defined for the RPA related services. The scope of service within the entity of an RPA related service is defined to be the portion of the entity that the associated node corresponds to. For example, an RPA related service associated with organization node 602, which corresponds to the entity, will be accessible to the entire entity. In another example, an RPA related service associated with a tenant 604-A, which corresponds to a particular unit of the entity, will be accessible to that particular unit. An RPA related service associated with a node at one level can access data associated at lower level child nodes. The association between an RPA related service and a node of hierarchical model 600 is performed prior to providing the RPA related service to the entity. Accordingly, the scope of service for an RPA related service cannot be chosen dynamically by the entity during provisioning of the RPA related service.

In one embodiment, licenses for RPA related services may be associated with users of the organization to define access rights for the users to use the licensed RPA related services. The licenses for RPA related services may additionally or alternatively be associated with one or more of the nodes of hierarchy 600 to define a scope of service for the licensed RPA related services. In one embodiment, each license for an RPA related service is associated with one of organization node 602 or tenant node 604. The license defining a scope of service for the RPA related services may be a license relating to resource usage (e.g., for utilizing a certain amount of resources). The association between the licenses for RPA related services and a node of hierarchy 600 is performed prior to providing the RPA related service to the entity.

Permissions for accessing (e.g., reading, writing, executing) RPA related services, data, or other resources may be defined for each RPA related services. In one embodiment, permissions are defined for a particular node of hierarchical model 600 to thereby define permissions for all RPA related services associated with that particular node. For example, permissions may be defined at organization node 602, tenant nodes 604, and/or orchestration folder nodes 606. In another embodiment, permissions may additionally or alternatively be defined for each RPA related service by defining the permissions at service specific container nodes 608.

In one embodiment, users of the entity may be associated with user accounts, which are defined at organizational node 602. The user accounts may also be associated with one or more other nodes of hierarchical model 600 to define permissions for accessing (e.g., reading, writing, executing) RPA related services, data, or other resources based on the user ID of the user account. In one embodiment, the permissions for the users may be defined based on user groups to simplify the user experience and reduce the requirements for configuring complex permissions. Users may be assigned to one or more user groups and the permissions may be defined for the user groups (e.g., by associating a user group with a node of hierarchical model 600). Accordingly, users assigned to a particular user group will have the permissions defined for that user group. In one embodiment, the user groups may comprise the following default user groups: an automation users group, a developers group, and an everyone group.

Returning to FIG. 5, at step 504, a routing address is defined for each respective RPA related service of the plurality of RPA related services according to a standardized format for the RPA cloud suite based on the node associated with the respective RPA related service. The routing addresses may be references pointing to the location of the RPA related services in the cloud.

In one embodiment, the routing address is a URL (uniform resource locator). The format of the URL is defined according to the hierarchical model 600 of FIG. 6 based on whether the RPA related service is defined at organization node 602 or tenant node 604. In one embodiment, where the RPA related service is associated with organization node 602, the standardized format for each RPA related service of the RPA cloud suite is:

https://[hostname]/[organization]/[service].

In another embodiment, where the RPA related service is associated with tenant node 604, the standardized format for each RPA related service of the RPA cloud suite is:

https://[hostname]/[organization]/[tenant]/[service].

The variable [hostname] refers to a hostname (e.g., of the RPA provider or of the entity), the variable [organization] refers to the entity name representing organization node 602, the variable [tenant] refers to a name of a unit of the entity representing tenant node 604, and the variable [service] refers to a name of the RPA related service representing service specific container node 608. As shown in the standardized formats above, the file path portion of the URL (i.e., the portion of the URL after [hostname] in the examples above) is based on the hierarchy of hierarchical model 600. Thus, each of the RPA related services of the RPA suite are accessible via a routing address following the same standardized format.

Figure 7:
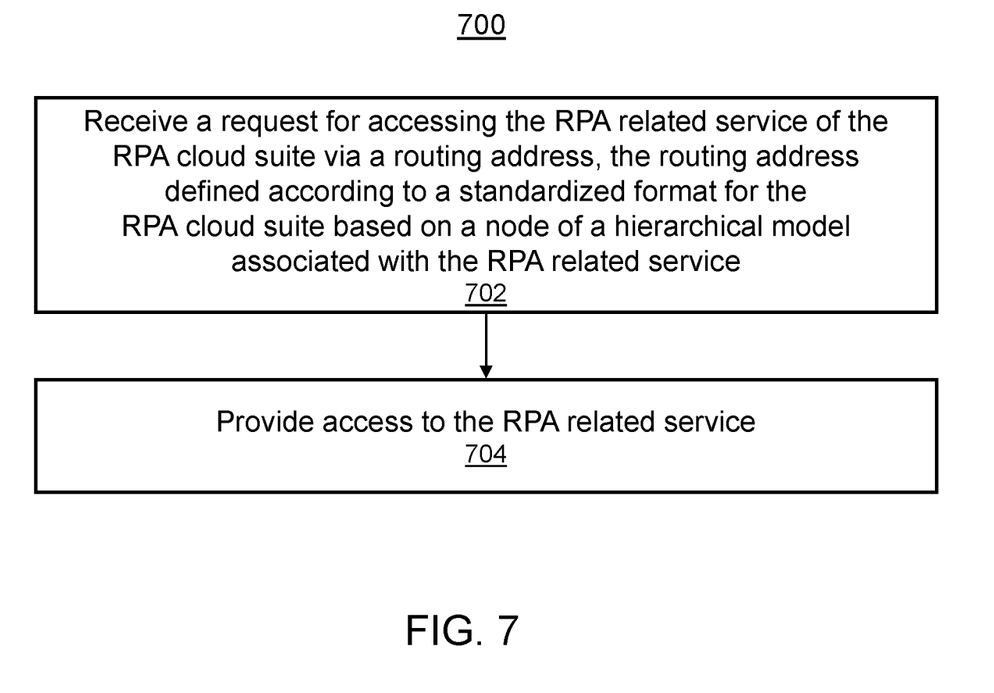
FIG. 7 shows a method for accessing an RPA related service of an RPA cloud suite, in accordance with an embodiment of the invention.

Once the routing addresses for the plurality of RPA related services of the RPA cloud suite are defined, the RPA related services may be accessed via the defined routing addresses. FIG. 7 shows a method 700 for accessing an RPA related service of an RPA suite, in accordance with one or more embodiments. The steps of method 700 may be performed by one or more suitable computing devices, such as, e.g., computing system 800 of FIG. 8.

At step 702, a request for accessing the RPA related service of the RPA cloud suite via a routing address is received. The routing address is defined according to a standardized format for the RPA cloud suite based on a node of a hierarchical model associated with the RPA related service. The hierarchical model may be based on an organizational structure of an entity for which the RPA cloud suite was implemented. In one embodiment, the hierarchical model may be hierarchical model 600 of FIG. 6. A scope of service of the RPA related service is defined based on the associated node. Permissions for the RPA related service may be defined by defining permissions for the associated node. In one embodiment, the routing address is based on a hierarchy of the hierarchical model. The routing address may be a URL.

In one embodiment, the routing address for the RPA related service is defined according to method 500 of FIG. 5. Accordingly, it should be understood that features described with respect to method 500 of FIG. 5 may also be applied at method 700 and vice versa.

At step 704, in response to receiving the request, access to the RPA related service is provided. Access to the RPA related service may be provided for a user account associated with the associated node.

Advantageously, embodiments described herein enable a single cloud platform for implementing all RPA related services in an RPA cloud suite for an entity, thereby providing the entity with a unified view that models their organizational structure across all RPA related services and providing a consistent address scheme for accessing the RPA related services. New RPA related services may be easily adopted into the RPA cloud suite with a relatively low cost of onboarding. Permissions for RPA related services and users may be easily configured based on nodes or user groups.

Figure 8:
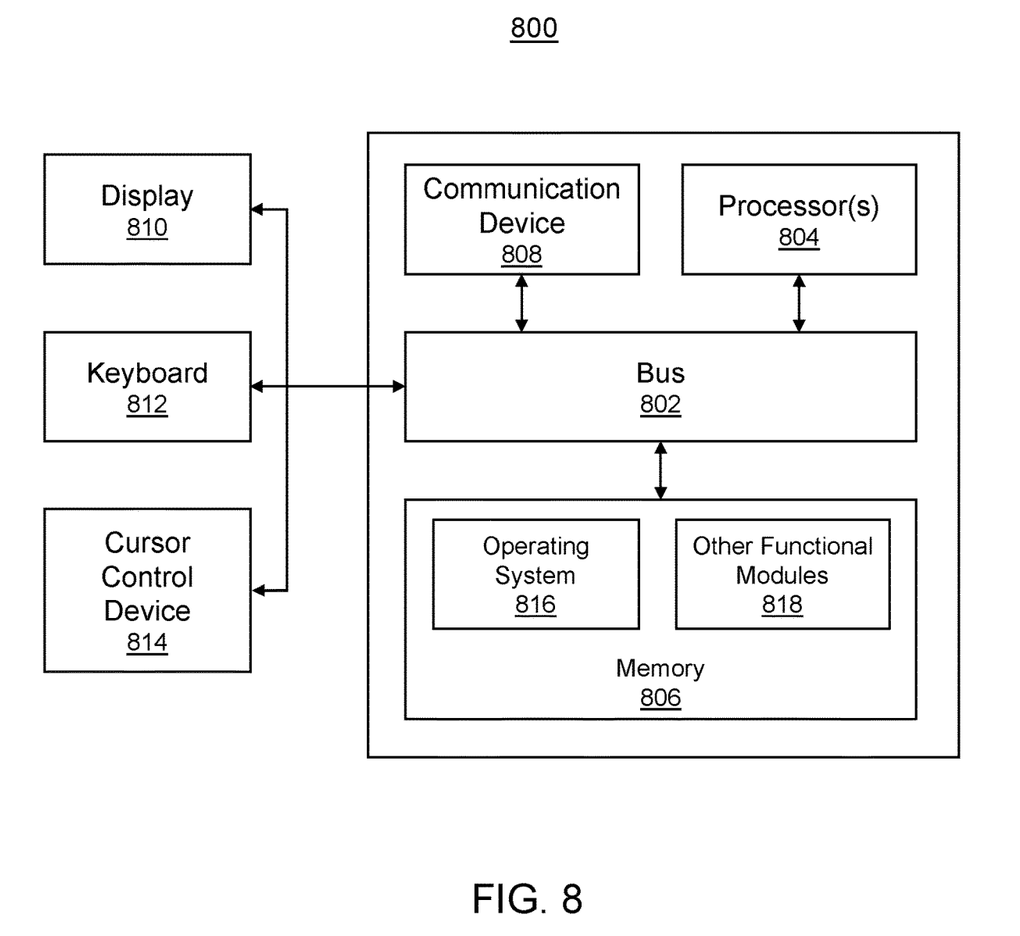
FIG. 8 is a block diagram of a computing system, which may be used to implemented embodiments of the invention.

FIG. 8 is a block diagram illustrating a computing system 800 configured to execute the methods, workflows, and processes described herein, including method 500 of FIG. 5 and method 700 of FIG. 7, according to an embodiment of the present invention. In some embodiments, computing system 800 may be one or more of the computing systems depicted and/or described herein. Computing system 800 includes a bus 802 or other communication mechanism for communicating information, and processor(s) 804 coupled to bus 802 for processing information. Processor(s) 804 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 804 may also have multiple processing cores, and at least some of the cores may be configured to perform specific functions. Multi-parallel processing may be used in some embodiments.

Computing system 800 further includes a memory 806 for storing information and instructions to be executed by processor(s) 804. Memory 806 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 804 and may include volatile media, non-volatile media, or both. The media may also be removable, non-removable, or both.

Additionally, computing system 800 includes a communication device 808, such as a transceiver, to provide access to a communications network via a wireless and/or wired connection according to any currently existing or future-implemented communications standard and/or protocol.

Processor(s) 804 are further coupled via bus 802 to a display 810 that is suitable for displaying information to a user. Display 810 may also be configured as a touch display and/or any suitable haptic I/O device.

A keyboard 812 and a cursor control device 814, such as a computer mouse, a touchpad, etc., are further coupled to bus 802 to enable a user to interface with computing system. However, in certain embodiments, a physical keyboard and mouse may not be present, and the user may interact with the device solely through display 810 and/or a touchpad (not shown). Any type and combination of input devices may be used as a matter of design choice. In certain embodiments, no physical input device and/or display is present. For instance, the user may interact with computing system 800 remotely via another computing system in communication therewith, or computing system 800 may operate autonomously.

Memory 806 stores software modules that provide functionality when executed by processor(s) 804. The modules include an operating system 816 for computing system 800 and one or more additional functional modules 818 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer implemented method for implementing an RPA (robotic process automation) cloud suite comprising a plurality of RPA related services comprising:
    associating each of the plurality of RPA related services of the RPA cloud suite with one of a plurality of nodes of a hierarchical model; and
    defining a routing address for each respective RPA related service of the plurality of RPA related services according to a standardized format for the RPA cloud suite, the routing address comprising a file path defined to correspond to a hierarchy of the hierarchical model from a root node to the node associated with the respective RPA related service.

2. The computer implemented method of claim 1, wherein the hierarchical model is based on an organizational structure of an entity for which the RPA cloud suite is being implemented.

3. The computer implemented method of claim 2, wherein the hierarchical model comprises a first level having an organization node corresponding to the entity and a second level having one or more tenant nodes each corresponding to a unit of the entity.

4. The computer implemented method of claim 1, wherein a scope of service of the RPA related services is defined based on their associated node.

5. The computer implemented method of claim 1, wherein associating each of the plurality of RPA related services of the RPA cloud suite with one of a plurality of nodes of a hierarchical model comprises:
    associating licenses for one or more of the RPA related services with one of the plurality of nodes of the hierarchical model.

6. The computer implemented method of claim 1, wherein the routing address is a URL (uniform resource locator).

7. The computer implemented method of claim 1, further comprising:
    defining permissions for one or more nodes of the hierarchical model to define permissions for RPA related services associated with the one or more nodes.

8. The computer implemented method of claim 1, wherein the associating and the defining are performed by one or more computing devices implemented in a cloud computing system.

9. An apparatus comprising:
    a memory storing computer instructions; and
    at least one processor configured to execute the computer instructions for implementing an RPA (robotic process automation) cloud suite comprising a plurality of RPA related services, the computer instructions configured to cause the at least one processor to perform operations of:
        associating each of the plurality of RPA related services of the RPA cloud suite with one of a plurality of nodes of a hierarchical model; and
        defining a routing address for each respective RPA related service of the plurality of RPA related services according to a standardized format for the RPA cloud suite, the routing address comprising a file path defined to correspond to a hierarchy of the hierarchical model from a root node to the node associated with the respective RPA related service.

10. The apparatus of claim 9, wherein the hierarchical model is based on an organizational structure of an entity for which the RPA cloud suite is being implemented.

11. The apparatus of claim 10, wherein the hierarchical model comprises a first level having an organization node corresponding to the entity and a second level having one or more tenant nodes each corresponding to a unit of the entity.

12. The apparatus of claim 9, wherein a scope of service of the RPA related services is defined based on their associated node.

13. The apparatus of claim 9, wherein associating each of the plurality of RPA related services of the RPA cloud suite with one of a plurality of nodes of a hierarchical model comprises:

associating licenses for one or more of the RPA related services with one of the plurality of nodes of the hierarchical model.

14. The apparatus of claim 9, wherein the apparatus is implemented in a cloud computing system.

15. A computer implemented method for accessing an RPA related service of an RPA (robotic process automation) cloud suite comprising:

receiving a request for accessing the RPA related service of the RPA cloud suite via a routing address, the routing address defined according to a standardized format for the RPA cloud suite, the routing address comprising a file path defined to correspond to a hierarchy of a hierarchical model from a root node to a node associated with the RPA related service; and in response to receiving the request, providing access to the RPA related service.

16. The computer implemented method of claim 15, wherein the hierarchical model is based on an organizational structure of an entity for which the RPA cloud suite was implemented.

17. The computer implemented method of claim 16, wherein the hierarchical model comprises a first level having an organization node corresponding to the entity and a second level having one or more tenant nodes each corresponding to a unit of the entity.

18. The computer implemented method of claim 15, wherein a scope of service of the RPA related service is defined based on the associated node.

19. The computer implemented method of claim 15, wherein the routing address is a URL (uniform resource locator).

20. The computer implemented method of claim 15, wherein permissions for the RPA related service are defined by defining permissions for the associated node.

21. The computer implemented method of claim 15, wherein the receiving and the providing are performed by one or more computing devices implemented in a cloud computing system.

22. An apparatus comprising:

a memory storing computer instructions; and at least one processor configured to execute the computer instructions for accessing an RPA (robotic process automation) related service of an RPA cloud suite, the computer instructions configured to cause the at least one processor to perform operations of:

receiving a request for accessing the RPA related service of the RPA cloud suite via a routing address, the routing address defined according to a standardized format for the RPA cloud suite, the routing address comprising a file path defined to correspond to a hierarchy of a hierarchical model from a root node to a node associated with the RPA related service; and in response to receiving the request, providing access to the RPA related service.

23. The apparatus of claim 22, wherein the hierarchical model is based on an organizational structure of an entity for which the RPA cloud suite was implemented.

24. The apparatus of claim 23, wherein the hierarchical model comprises a first level having an organization node corresponding to the entity and a second level having one or more tenant nodes each corresponding to a unit of the entity.

25. The apparatus of claim 22, wherein a scope of service of the RPA related service is defined based on the associated node.

26. The apparatus of claim 22, wherein the routing address is a URL (uniform resource locator).

27. The apparatus of claim 22, wherein the apparatus is implemented in a cloud computing system.

* * * * *